April 23, 1929.  D. C. CUNNEEN  1,709,898
PIPE HOLDER OR SUPPORT
Filed April 6, 1926
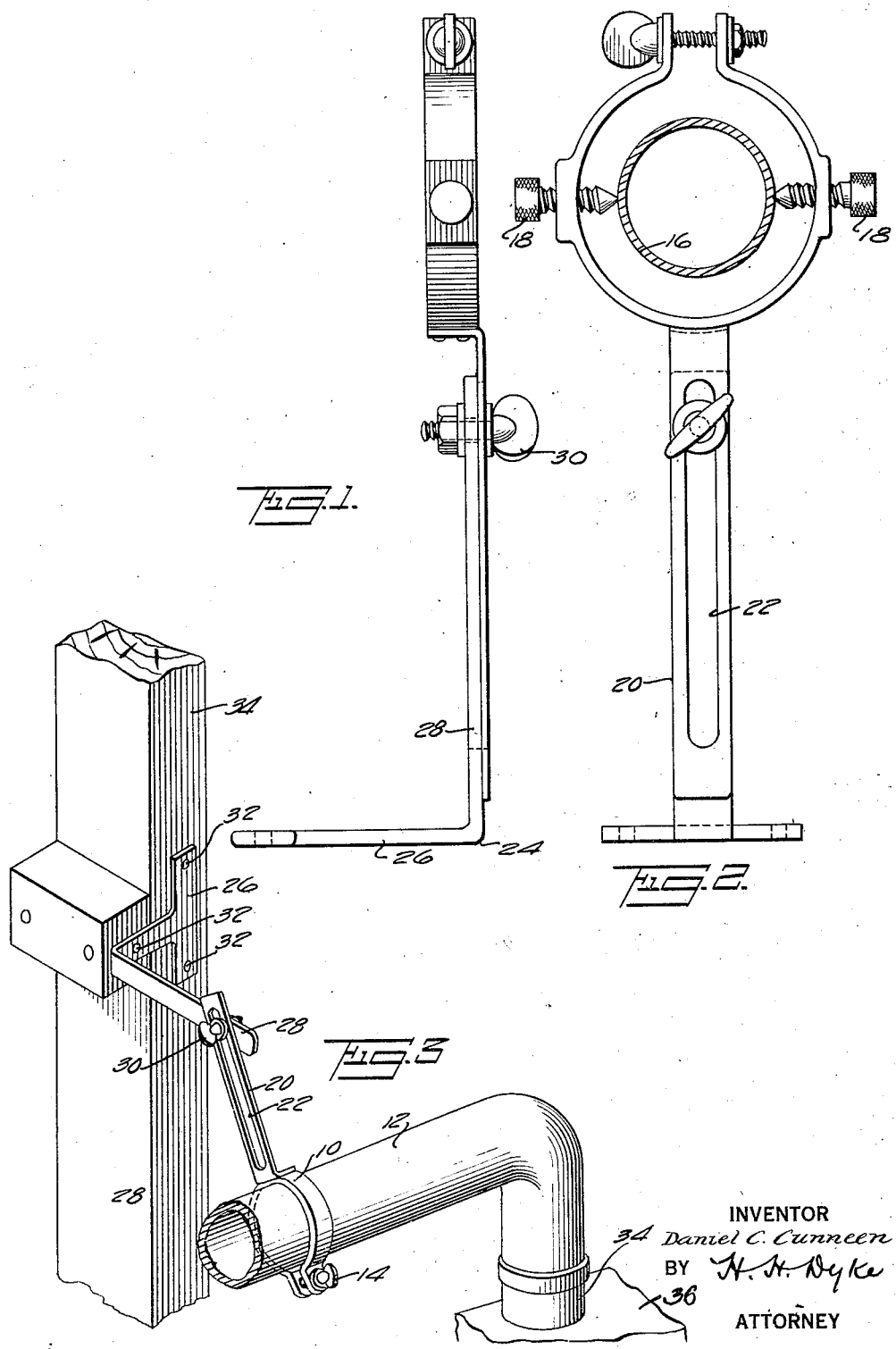
INVENTOR
Daniel C. Cunneen
BY H. H. Dyke
ATTORNEY Patented Apr. 23, 1929.

1,709,898

UNITED STATES PATENT OFFICE.

DANIEL C. CUNNEEN, OF NEW ROCHELLE, NEW YORK.

PIPE HOLDER OR SUPPORT.

Application filed April 6, 1926. Serial No. 100,065.

My invention is a pipe holder or support for holding parts, such as pipes, lead bends, etc., while performing operations thereon, such as wiping and soldering joints and the like.

The invention provides a device which is simple, readily folded up for packing in a tool kit, and is adapted for use in a variety of positions and with substantially any kind of support. The invention will be best understood from the following description of an embodiment thereof.

In the drawings Fig. 1 is a side view and Fig. 2 a front view of the device, and Fig. 3 is a perspective illustrating one way in which it may be used.

Split ring clamp 10 is used for clamping a member, such as a lead bend 12, the clamp being secured by the thumb screw 14. If a pipe or other member as 16 of less diameter than the opening of ring clamp 10 is to be held, means such as the set screws 18, 18 may be provided to adapt clamp 10 for this purpose.

Clamp 10 has an arm 20 secured thereto provided with a longitudinal slot 22. Arm 20 is pivotally and slidably connected with a standard 24 comprising a base 26 and post 28. As shown, the connection is made by a thumb screw 30 passing through a hole in post 26 and through the slot 22 in arm 20. Base 26 may be of various forms, but is shown as T-shaped and provided with holes 32 in each branch and the stem of its T formation.

In use the base 26 is secured to any convenient support to be found on the job or bench, as, for example, to the stud 34 in a house under construction, with the post 28 projecting in such direction as may be required for the desired supporting action; the article to be held, as the lead bend 12, is clamped by clamp 10, and the length and direction of arm 20 with respect to post 28 chosen to properly locate the work by pivoting and sliding arm 20 with respect to post 28, and the parts locked in the desired position by thumb screw 30. If it is desired to wipe a joint between the lead bend 12 and a brass ferrule 34, the former may be inserted in the latter, and the latter may be blocked or held up in any convenient manner, as indicated at 36, whereupon the plumber can proceed to wipe the joint single handed and without the need of assistance.

This is but one of the many ways in which the apparatus is used, but will be sufficient to afford an understanding of the invention.

When not in use the device may be collapsed to its shortest dimension, as shown in Figs. 1 and 2, and readily stored in a tool kit.

Modifications within the scope of my claim may be resorted to without departing from my invention.

I claim:

A pipe holder or support comprising a rigid bracket member including a base having means for securing the same to a support and an arm extending from said base, a rigid pipe engaging member including a split clamping ring adapted to be disposed in clamping relation about a pipe and an arm extending radially from said ring; one of said arms having a slot, and clamping means extending through said slot and the other of said arms for adjustably securing said members directly together; said rigid bracket member and said rigid pipe engaging member providing a two part single jointed connection between the pipe and the support therefor; and the same, when not in use, being collapsible to position said arms one along the other and the ends thereof contiguous to said ring and said base respectively.

In testimony whereof, I have signed my name hereto.

DANIEL C. CUNNEEN.